Patented Mar. 22, 1927.

1,621,763

UNITED STATES PATENT OFFICE.

BUNKICHI YOKOYAMA, OF LOS ANGELES, CALIFORNIA.

PROCESS OF MAKING FRIED RICE FOOD.

No Drawing.   Application filed October 12, 1926. Serial No. 141,245.

This invention has reference to a process for manufacturing a food composition, and the object is to produce a food of the character set forth, that is palatable and of good keeping quality.

With this object in view, the invention consists in the novel steps of the process, as will be hereinafter set forth.

In carrying out the process of making fried rice food, I take a quantity of peanuts and roast them, and then grind them into a flour. I then take a quantity of glutinous rice, and wash it thoroughly, and then steep it in pure water for about ten hours, I then take the rice from the water and separate all surplus moisture from the rice. I then steam the rice in any suitable manner for about one hour, and then pound the rice until it becomes a thick paste, and, while pounding the rice, I add the peanut flour thereto, in small quantities at a time, until all is thoroughly mixed. Although I prefer to use glutinous rice, ordinary rice of good quality may be considered the equivalent thereof, and, may use any freshly ground roasted peanut flour.

I then place the dough formed thereby in a thin layer in a shallow tray, having shallow or narrow frames for the sides thereof, and allow the dough to dry for two days, or until it has dried sufficiently so that it may be cut with a knife. I then cut the dough into small pieces and place on a tray, and allow the same to dry for seven days, or to dry very hard by any suitable means. I then fry the dried pieces in a boiling salad oil, having a temperature of about 300° F., and fry for about twenty minutes, and then take the fried pieces from the oil, and dry them, and then pack them in paraffin paper bags.

I prefer to use a salad oil in which to fry the rice dough, but pure olive oil may be substituted for and considered the equivalent of the salad oil. When the fried pieces are taken out of the oil, a suitable flavoring substance may be spread upon the same, if desired.

The mixture which I have found to be the most desirable for use consists of glutinous rice, 90 per cent, and roasted peanut flour, 10 per cent. The material thus prepared, is very palatable, and, if put in paraffin paper bags as specified, will keep for a long time.

I claim:

1. The herein-described process of making fried rice food, which consists in roasting a quantity of peanuts, and then grinding them into a fine flour, then washing a quantity of glutinous rice, then steeping the rice in pure water for ten hours, then taking the rice from the water and separating the moisture from the rice, then steaming the rice for one hour, then pounding the rice, and adding the peanut flour thereto in small quantities during the pounding step until well mixed, then drying the dough formed thereby in shallow trays for two days, then in cutting the dough into small pieces, then drying the pieces for seven days, then frying the dried pieces in a boiling salad oil of a temperature of about 300° F., for twenty minutes, and finally in drying the fried pieces.

2. The herein-described process of making fried rice food, which consists in first preparing a flour from roasted peanuts, then washing a quantity of glutinous rice, then separating the rice from the water, then steeping the rice for ten hours in pure water, then taking the steeped rice from the water, then steaming the rice for one hour, then pounding the rice into a paste, and, while pounding the rice, adding the peanut flour thereto, in small quantities at a time until all is well mixed, then drying the dough thus formed for two days, then cutting the dough into small pieces, then further drying the dough for seven days, then frying the dried dough in a boiling salad oil for twenty minutes, then removing the fried pieces from the oil, then adding a flavoring substance to the fried pieces by spreading the flavoring thereon, and finally in drying the fried pieces of dough.

In testimony whereof, I hereunto affix my signature.

BUNKICHI YOKOYAMA.